United States Patent [19]

Pellerin

[11] Patent Number: 5,076,219
[45] Date of Patent: Dec. 31, 1991

[54] INTERNAL-COMBUSTION ENGINE WITH ROTARY DISTRIBUTION

[76] Inventor: Jacques Pellerin, 59 Bd de la République, 91450 Soisy Sur Seine, France, 91450

[21] Appl. No.: 474,738
[22] PCT Filed: Oct. 12, 1988
[86] PCT No.: PCT/FR88/00504
  § 371 Date: Apr. 12, 1990
  § 102(e) Date: Apr. 12, 1990
[87] PCT Pub. No.: WO89/03474
  PCT Pub. Date: Apr. 20, 1989

[30] Foreign Application Priority Data
  Oct. 16, 1987 [FR] France ............... 87 14287

[51] Int. Cl.⁵ .............................. F01L 7/00
[52] U.S. Cl. ...................... 123/59 AD; 123/190 D; 123/666
[58] Field of Search .......... 123/73 D, 59 AD, 190 D, 123/664, 666, 661

[56] References Cited
U.S. PATENT DOCUMENTS

| | | | |
|---|---|---|---|
| 1,711,781 | 5/1929 | Gibson et al. | 123/59 AD |
| 2,444,696 | 7/1948 | Riestra et al. | 123/190 D |
| 3,526,215 | 9/1970 | Aspin | 123/190 D |
| 3,603,299 | 9/1971 | Lamperti | 123/190 D |
| 4,033,317 | 7/1977 | Aspin | 123/190 D |
| 4,311,119 | 1/1982 | Menzies et al. | 123/190 D |
| 4,359,981 | 11/1982 | Kanda et al. | 123/188 M |
| 4,373,476 | 2/1983 | Vervoordt et al. | 123/190 D |
| 4,838,220 | 6/1989 | Parsons | 123/190 D |

FOREIGN PATENT DOCUMENTS

| | | |
|---|---|---|
| 611669 | 1/1961 | Canada ............... 123/59 AD |
| 2452577 | 5/1975 | Fed. Rep. of Germany . |
| 3327810 | 2/1984 | Fed. Rep. of Germany . |
| 1571711 | 6/1969 | France . |
| 2131241 | 11/1972 | France . |
| WO87/01415 | 3/1987 | Int'l Pat. Institute . |
| WO87/03929 | 7/1987 | Int'l Pat. Institute . |

*Primary Examiner*—David A. Okonsky
*Attorney, Agent, or Firm*—Young & Thompson

[57] ABSTRACT

A rotary bell (36) driven by a hollow shaft (42) and a pinion (46) selectively exposes intake and exhaust ports of the cylinder head (23). The bell (36) delimits a substantially hemispherical combustion chamber (26) and has a progression face (62) which partially protects the piston (1) from the expansion pressure near the top dead center, that is to say when the pressure variation is the most abrupt. The invention is used for improving the combustion, reducing the wear and increasing the operating comfort.

10 Claims, 8 Drawing Sheets

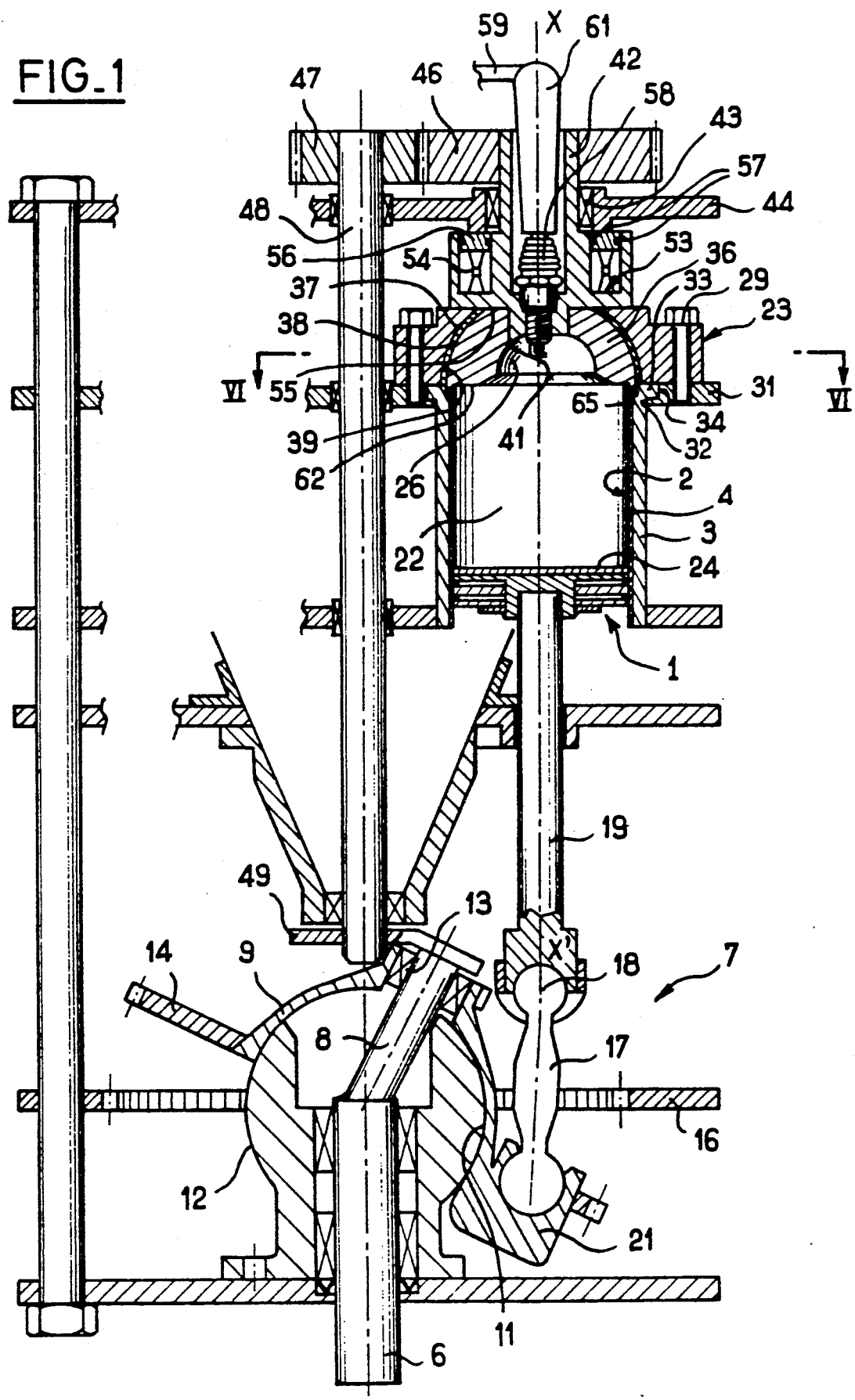
FIG_1

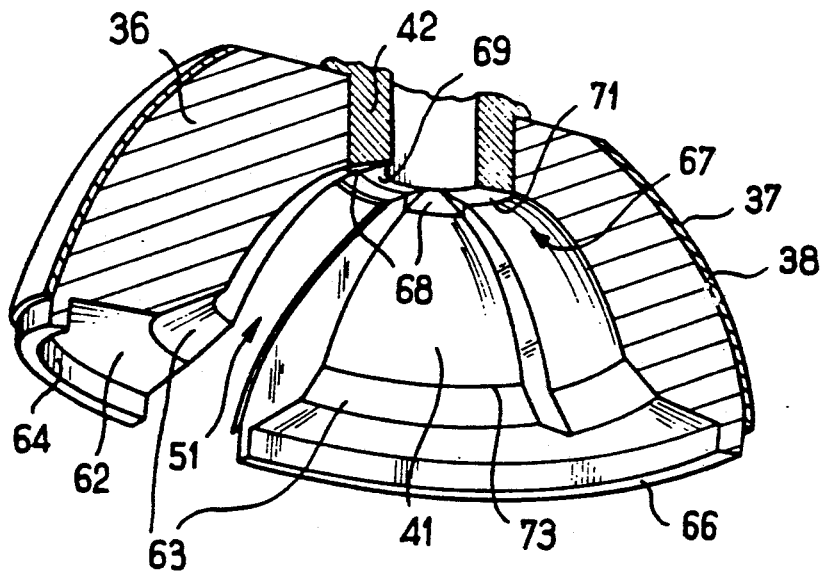
FIG_7
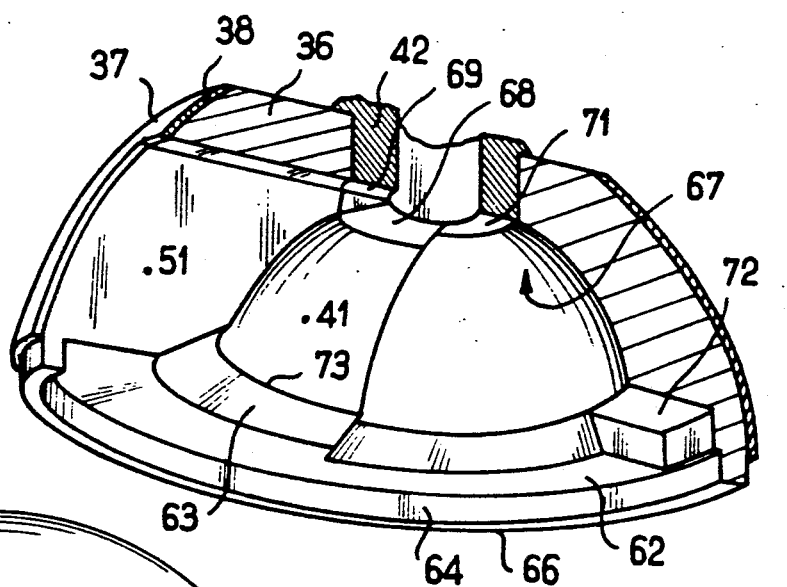
FIG_8
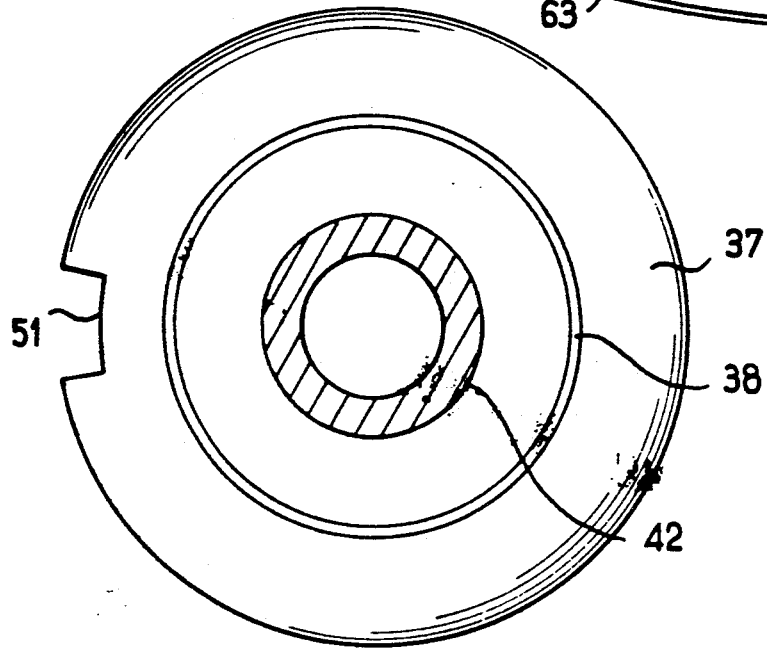
FIG_9

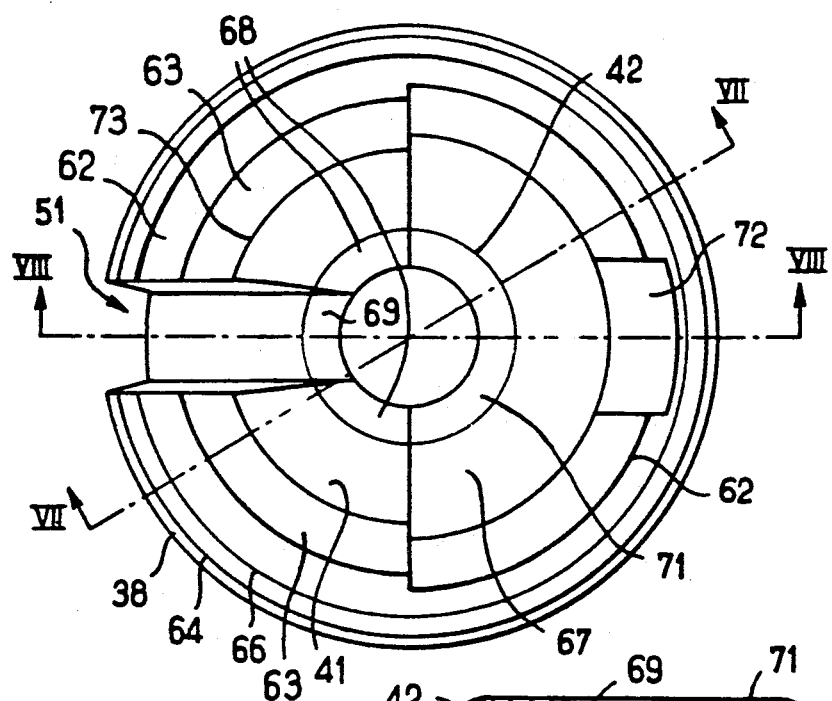
FIG._10
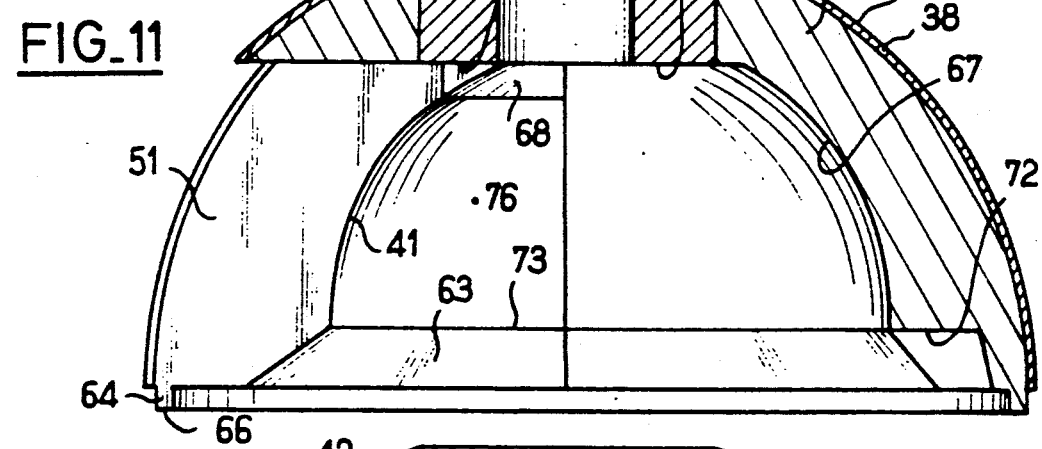
FIG._11
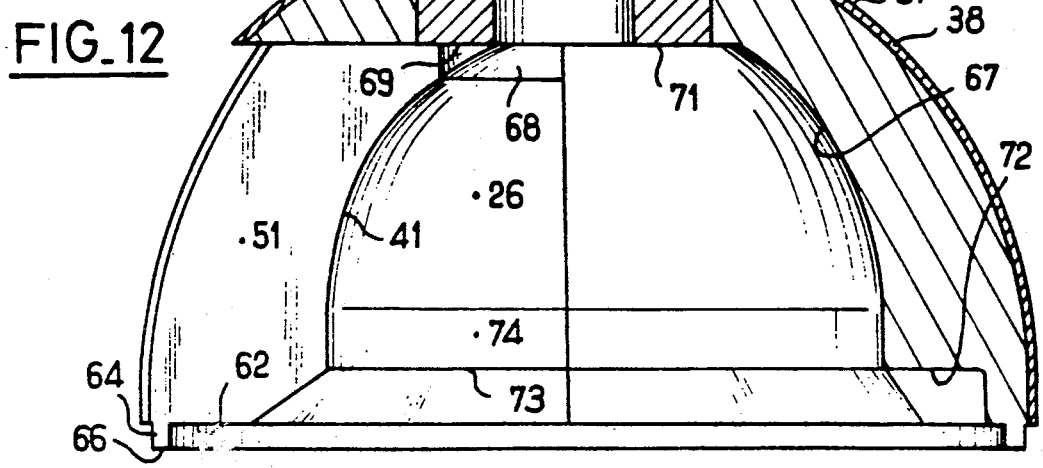
FIG._12

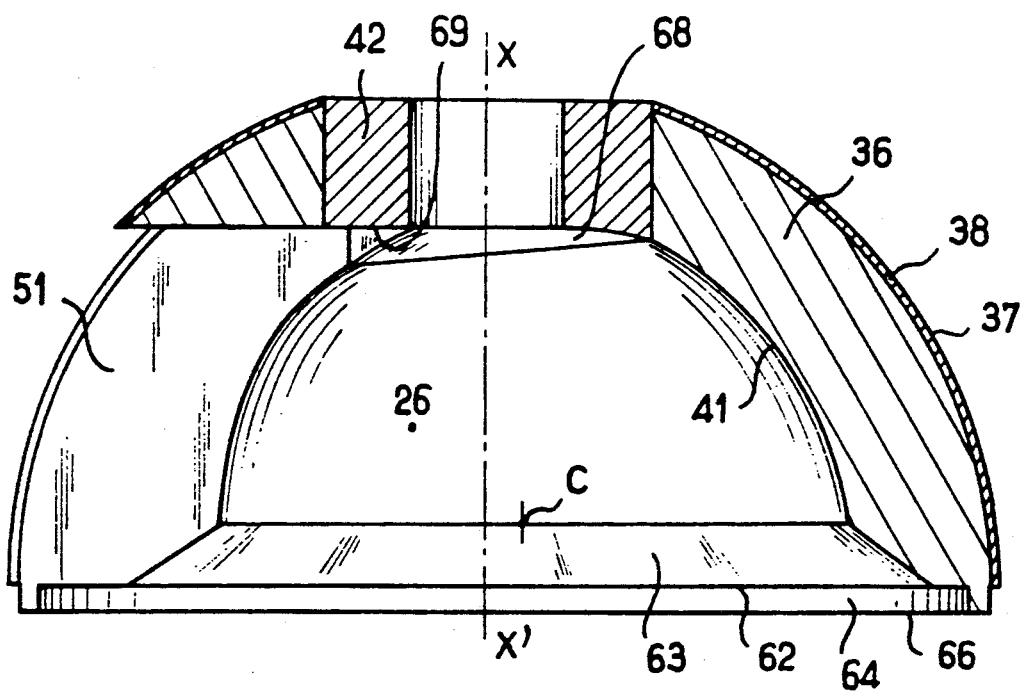
FIG_18
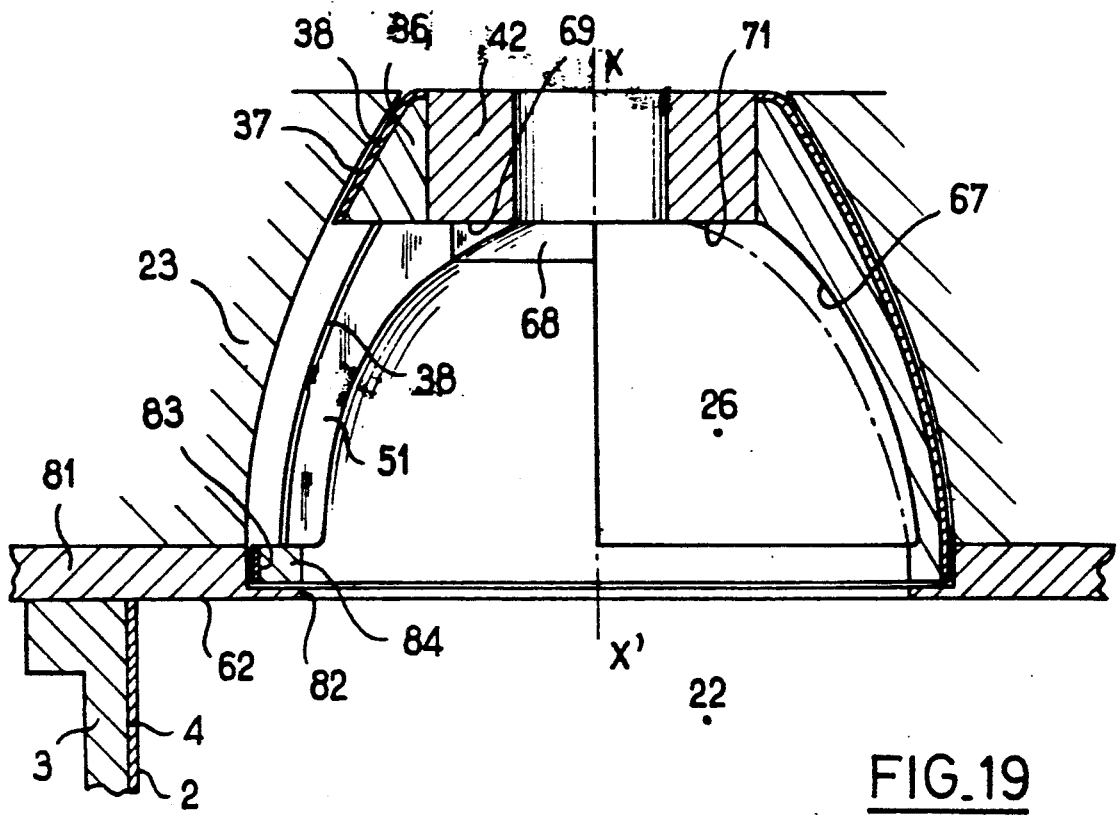
FIG_19

INTERNAL-COMBUSTION ENGINE WITH ROTARY DISTRIBUTION

The present invention relates to an internal-combustion engine with distribution by rotary shutter.

In the internal-combustion engines with a piston driven in a reciprocating movement, the distribution is conventionally obtained by means of cam-controlled sliding valves.

This device is noisy, subject to wear and energy-consuming and offers the gases only a limited passage cross-section. To increase the passage cross-section, the lift of the valves has to be increased, thus making it necessary to increase the force of the return springs and consequently reinforce the control members, thereby increasing their inertia and as a result making it necessary to increase the force of the return springs even further Thus a limit is quickly reached beyond which systems with more than two valves per cylinder have to be considered, but this is a costly solution entailing further noise and friction At all events, this known distribution makes it unavoidable to choose for the combustion chamber somewhat flattened shapes which are not ideal and which are governed by the need to give the valves the largest possible diameter and to provide between the valves and piston the clearance necessary for their relative movement when the piston is near its top dead centre.

The documents DE-A-3,327,810, FR-A-1,571,711 and US-A-4,359,981 propose to provide, on the cylinder head and on the piston, faces which come very near each-other and compress the gas situated between them when the piston reaches its top dead centre, in such a manner as to create turbulences in the combustion chamber at the moment of ignition. These turbulences are considered to accelerate the propagation of the combustion, in spite of the more or less favourable forms of the chamber which are set forth hereinabove. According to DE-A-3,327,810, the form of the chamber remains very flat. According to FR-A-1,571,711 and US-A-435,981, the chamber is more compact but its walls define together with at least one of the valves in the opening position constrictions which impair the breathing of the engine. Furthermore, the teaching of the three documents appears to be incompatible with the presence of four valves per cylinder. The teaching of these three documents is therefore, on an overall basis, opposed to a good circulation of the gases in the engine.

Moreover, the presence of this face of the piston which closely approaches a corresponding face of the cylinder head when the piston is at top dead centre has consequential effects on the pressure distribution on the piston. During the ascent of the piston, the pressure is greater on this face of the piston than on the remainder of the piston. During the combustion, the opposite applies, this face is partially sheltered from the commencement of combustion. This leads to tilting torques on the piston.

WO-A-87 01415 also discloses an engine in which the distribution is ensured by means of a bell adjacent to the inner face of the cylinder head and driven in rotation in such a way that a slot of the bell selectively exposes intake and exhaust ports. Disadvantages arising as a result of the reciprocating movement of the valves are therefore eliminated. The breathing of the engine is excellent. However, this known structure also has disadvantages. With it, it is difficult to increase the compression ratio, whilst at the same time still giving the combustion chamber a shape favourable to combustion. On the other hand, the bell has to absorb a considerable shock at the start of each expansion. It has, moreover, been found that the slot provided through this bell had a disadvantage: the bell is not balanced about its axis of rotation and this can lead to vibrations and frictional forces which are very detrimental between the outer surface of the bell and the fixed wall of the cylinder head. WO-87/01415 mentions, in its FIG. 1, an item of prior art permitting the construction of a relatively compact combustion chamber and the limiting of the pressure on the piston and the bell at commencement of expansion, since a face of the bell is adjacent to a corresponding face of the piston when the latter is at top dead centre. However, this involves tilting torques on the piston and on the bell, and the bell is particularly unbalanced about its axis of rotation.

The object of the invention is, therefore, to provide an engine with distribution by rotary bell, the compression ratio of which can be selected relatively high, as desired, without the piston being subjected to high force peaks or large tilting torques, and without the bell being either subjected to shocks or unbalanced significantly about its axis of rotation.

The invention is thus aimed at an internal-combustion engine comprising at least one cylinder, in which a working chamber is contained between a piston reciprocable between so-called top and bottom dead centres and connected to an output shaft by means of a movement-converting mechanism, and a cylinder head equipped with an intake port, with an exhaust port and with a shutter bell, an outer face of which is adjacent to a complementary inner face belonging to the cylinder head, the working chamber being reduced to a combustion chamber defined between an inner face of the bell and the piston when the piston is at its top dead centre, the engine also comprising combustion-generating means and means for driving the bell in rotation, synchronized with that of the shaft, about an axis in relation to which the form of the outer face of the bell is one of revolution, so as selectively to put the working chamber in communication with the intake and exhaust ports via a slot of the bell, the working chamber being delimited about the inner face of the bell by an expansion progression face confronting the piston and adjacent to the piston when the piston is at its top dead centre, so as to limit the surface of the piston which is exposed to the pressure of the gases when the piston is at top dead centre.

According to the invention, the engine is characterized in that the surface area of the progression face is distributed about the axis of the cylinder in such a way as substantially to cancel any tilting torque exerted on the piston about each axis perpendicular relative to the axis of the cylinder when the piston is at top dead centre, in that the bell has means for balancing the masses about its axis of rotation, and in that the inner face of the bell has a region in the general form of a spherical zone.

Thus, for a given volume, the combustion chamber has a markedly more compact form which can be virtually perfectly hemispherical. As is known, hemispherical combustion chambers are favourable to a high efficiency of thermal engines. The prior art often calls "hemispherical" dome-shaped combustion chambers which are fairly remote from a perfect hemisphere. The invention makes it possible to come much nearer to the ideal hemispherical form. The combustion obtained is therefore of excellent quality. Moreover, when the piston is at its top dead centre, at the start of expansion, some of its surface is protected from the pressure of the gases. This ensures a more progressive exertion of the gas pressure on the piston and on the bell and consequently less wear of the mechanism during operation which, moreover, is less noisy and better lubricated. Furthermore, the distribution of the area of the progression face about the axis of the cylinder substantially suppresses the tilting torques on the piston at top dead centre. The bell, being balanced about its axis of rotation, no longer produces any vibrations and does not run the risk of wear in contact with the cylinder head. This balancing can be achieved all truely easily, having regard to the already nearly symmetrical arrangement which results from the distribution of the progression surface about the axis of the cylinder.

Other particular features and advantages of the invention will also emerge from the following description.

In the accompanying drawings given by way of non-limiting example:

FIG. 1 is a general view in axial section of an engine according to the invention, with the piston at bottom dead centre;

FIGS. 7 and 8 are sectional perspective views of the shutter bell in the respective planes VII—VII and VIII—VIII of FIG. 10;

FIG. 9 is a top view of the bell;

FIG. 10 is a bottom view of the bell;

FIG. 11 is a view in elevation and in section in the plane VIII—VIII of FIG. 10;

FIGS. 12, 13, 15, 18 and 19 are views similar to that of FIG. 11, but relating to five alternative embodiments of the invention;

Figure 6:
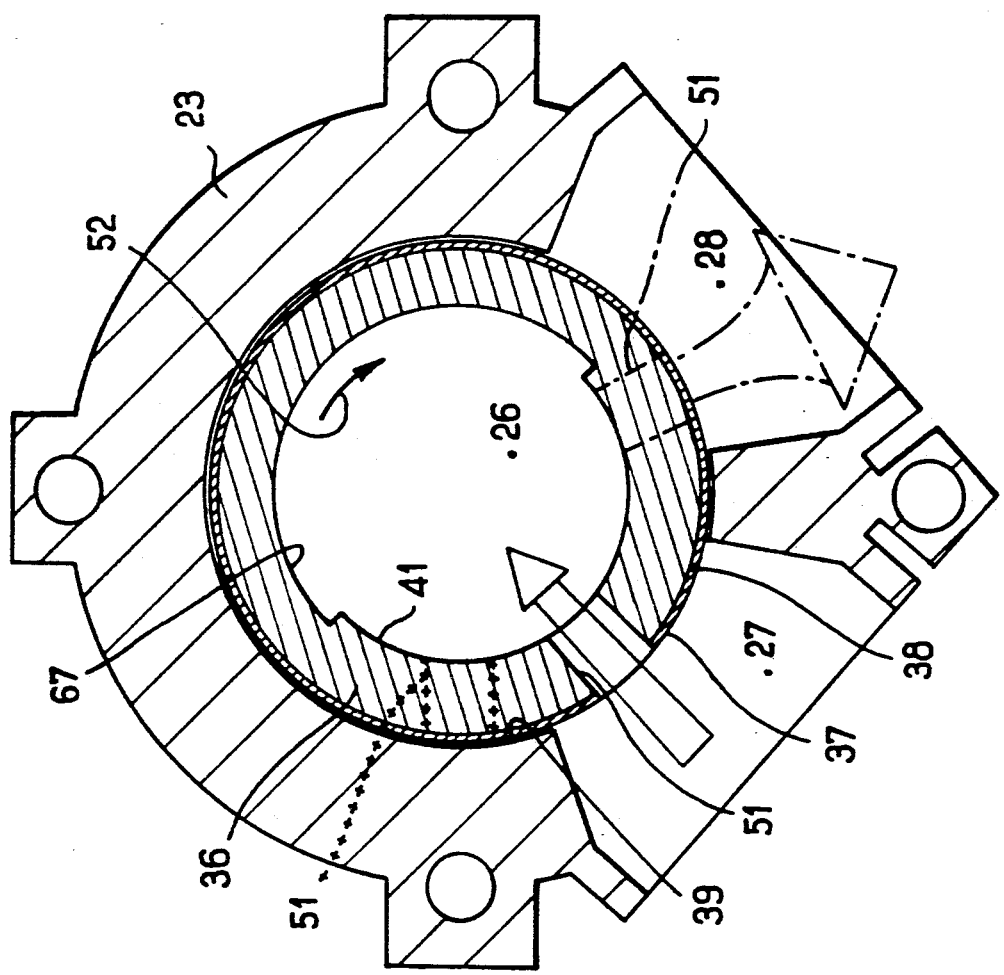
FIG. 6 is a sectional view in the plane VI—VI of FIG. 2 during a suction stroke.

The invention will be described hereafter in terms of its use for a so-called "barrel" engine.

Such an engine comprises a piston 1 reciprocable in a cylindrical bore 2 which will hereafter be referred to as a "cylinder" according to the customary terminology for thermal engines. The cylinder 2 is formed in a liner 3 equipped internally with an anti-heat coating 4, for example a material of the ceramic type, especially that sold under the brand name of "THERMOX".

Figure 2:
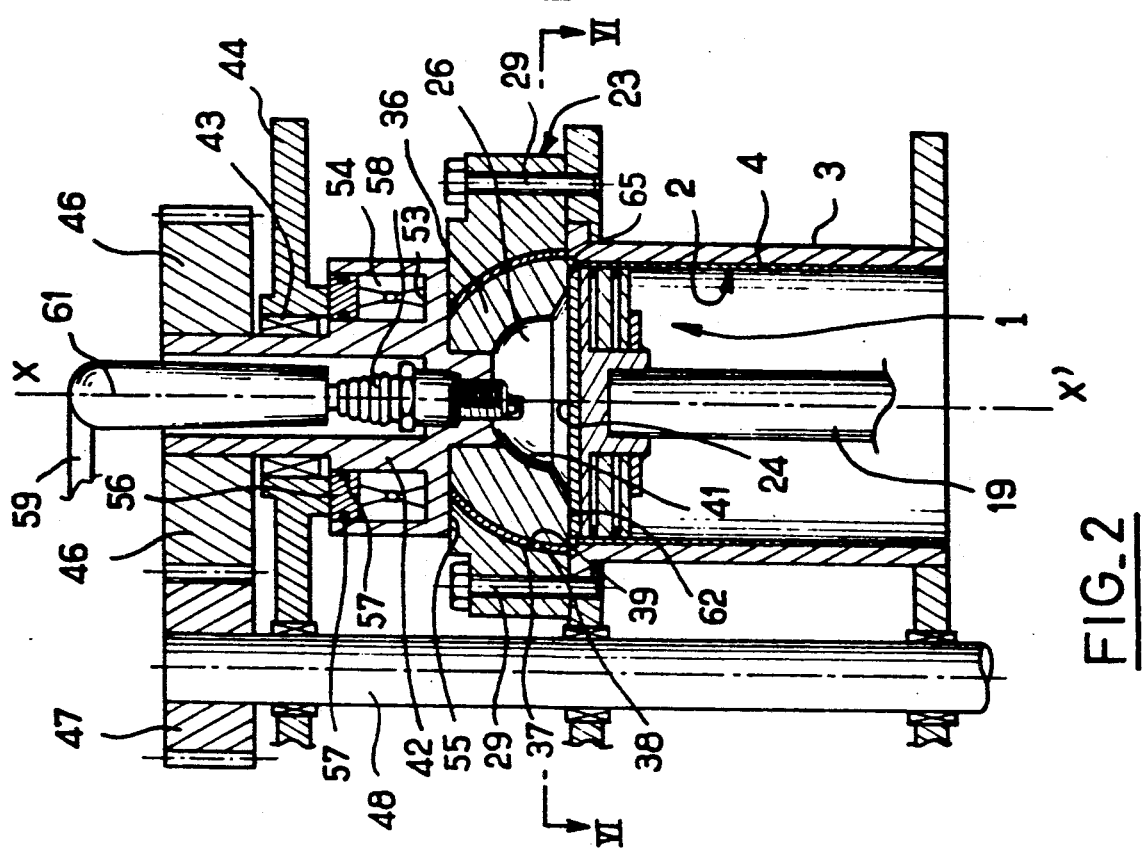
FIG. 2 is a view of a detail of FIG. 1, when the piston is at top dead centre, on an enlarged scale.
Figure 3:
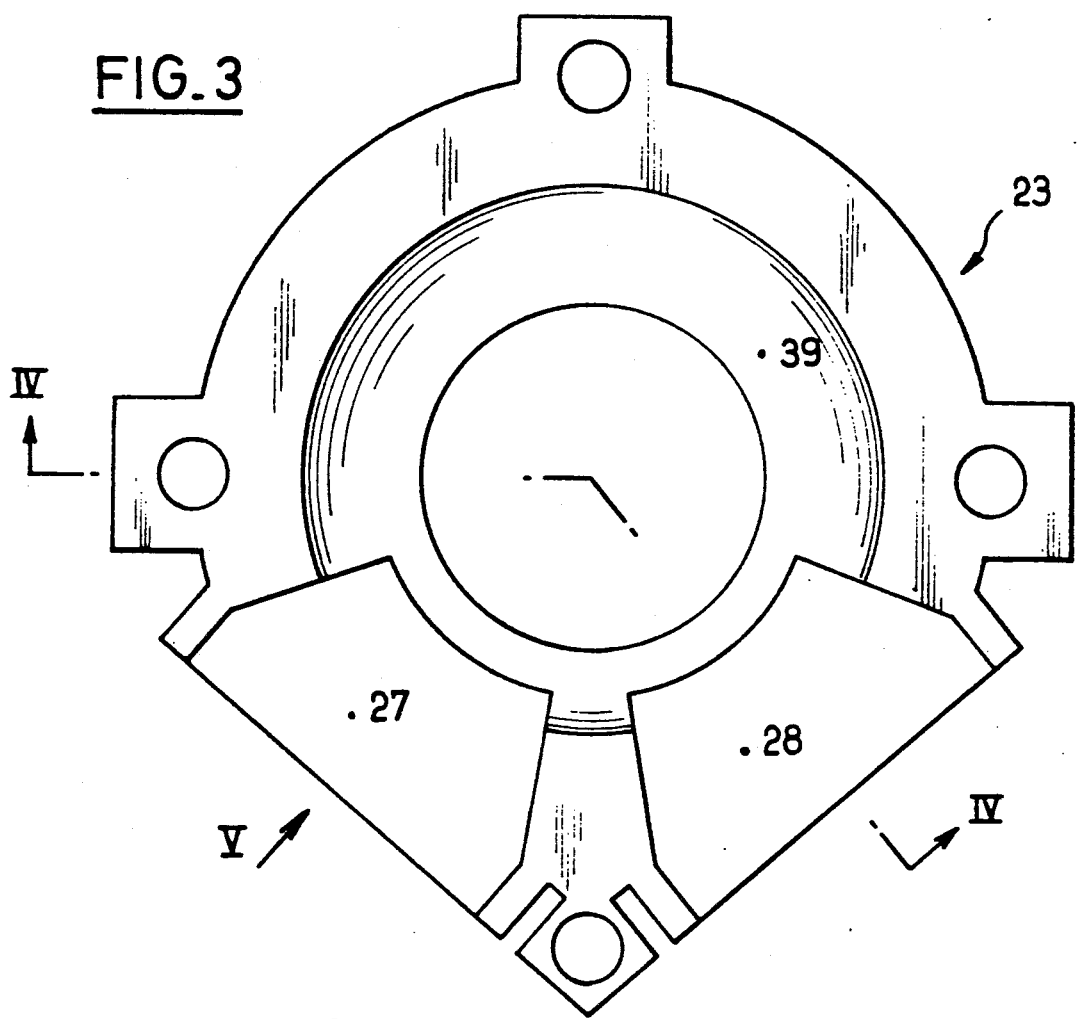
FIG. 3 is a bottom view of the cylinder head.
Figure 4:
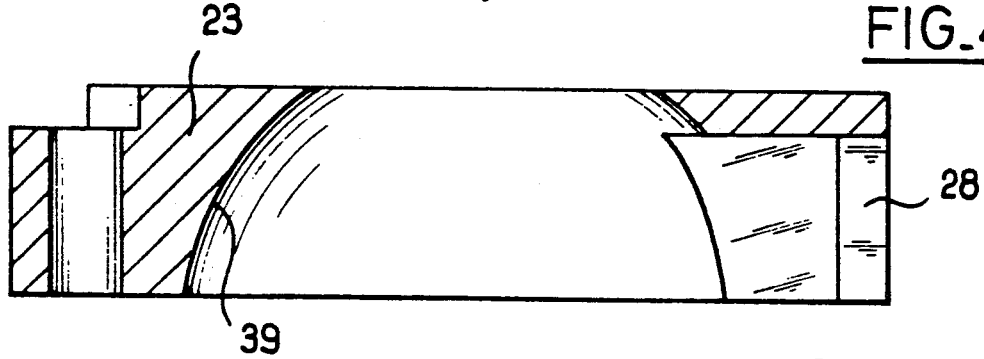
FIG. 4 is a sectional view along the line IV—IV of FIG. 3.
Figure 5:
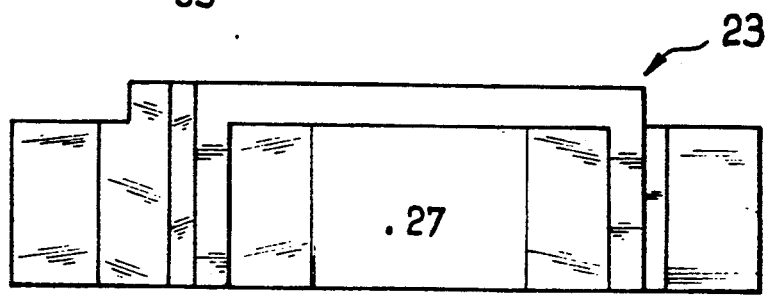
FIG. 5 is a partial view according to arrow V of FIG. 3.

The piston slidingly reciprocates along the axis XX' of the cylinder between the so-called bottom dead centre position shown in FIG. 1 and the so-called top dead centre position shown in FIG. 2. The piston 1 is connected to an output shaft 6 of the engine by means of a movement-converting mechanism 7. The latter comprises an oblique crank pin 8 of the output shaft 6. A cap 9, a spherical surface 11 of which is in pivoting contact with a spherical support 12 fastened to the frame of the engine around the shaft 6, is mounted freely rotatably about the crank pin 8 by means of a bearing 13. An externally toothed ring 14 which is fixed to the cap 9 and the axis of which coincides with the axis of the crank pin 8 meshes permanently, in two diametrically opposite positions, with an internally toothed ring 16 which is fixed to the frame of the engine and the axis of which coincides with the axis of rotation of the shaft 6. This meshing determines the angular position of the cap 9 round the crank pin 8. A connecting rod 17 has one end 18 articulated by ball joint with one end, remote from the piston 1, of a rod 19 connected rigidly to the piston 1 in the axis XX'. The other end of the connecting rod 17 is articulated by ball joint on a lug 21 carried laterally by the cap 9. The centre of ball-joint articulation of the lug 21 is located in the mid-plane of the toothed ring 14. In a known way, the mechanism 7 converts the expansion movement of the piston 1 into a fraction of a revolution of the shaft 6 and converts into exhaust, suction and compression movements of the piston 1 the subsequent rotation of the shaft 6 ensured by the inertia of an engine fly wheel and/or by the expansion energy generated in other piston/cylinder assemblies. In fact, FIG. 1 shows only a single piston/cylinder assembly, but a plurality of such assemblies can be distributed about the axis of the shaft 6. In such a case, the cap 9 carries a lug such as 21, for each piston/cylinder assembly.

A working chamber 22 is delimited in the cylinder 2 between a cylinder head 23 and a face 24 of the piston remote from rod 19 and equipped with an anti-heat covering, such as THERMOX. In a conventional way, the piston 1 is relatively distant from the cylinder head when it is at bottom dead centre (FIG. 1), the working chamber 22 then having a maximum volume, and it is relatively close to it when it is at top dead centre (FIG. 2), the working chamber then being reduced to a combustion chamber 26 which will be described in more detail later.

As shown in FIGS. 3 to 6, the cylinder head 23 has an intake port 27 and an exhaust port 28 in a suitable position about the axis XX'. In a way not shown, the ports 27 and 28 are connected to carburation means and to an exhaust manifold respectively. The cylinder head 23 is fastened by means of screws 29 to a plate 31 belonging to the engine frame. The liner 3 is received in a bore 32 of the plate 31. An upper collar 33 of the liner 3 is locked by means of the cylinder head 23 in a counter-bore 34 which widens the bore 32 adjacent the cylinder head 23.

The gas exchanges via the ports 27 and 28 of the cylinder head 23 are controlled by a shutter bell 36, of which a convex spherical outer face 37 equipped with an anti-heat covering 38, such as THERMOX, is adjacent to a complementary inner face 39 belonging to the cylinder head 23. An inner face 41 of the bell 36 delimits the combustion chamber 26. The spherical surfaces 37 and 39 are centred on the axis XX', whereby they are rotationally symmetrical about the axis XX'.

Fitted into the bell 36 is a hollow shaft 42 of axis XX', supported for rotation about the axis XX' by a bearing 43 in a plate 44 fixed to the engine frame. The bell 36 is fixed to the shaft 42, particularly for common rotation about the axis XX'. Beyond the plate 44, the shaft 42 is itself integral for common rotation with a pinion 46 meshing with a pinion 47 integral in terms of rotation with a central shaft 48 for driving the engine accessories. The shaft 48 is coaxial relative to the shaft 6 and is integral in terms of rotation with the latter. For this purpose, the shaft 48 is connected rigidly to the crank pin 8 by means of an arm 49. The number of teeth of the pinion 46 is double that of the pinion 47, so that the rotational speed of the bell 36 in the cylinder head 23 is half the rotational speed of the shaft 6.

As a result of this rotation, a slot 51 provided through the bell 36 puts the combustion chamber 26 (FIG. 6) selectively in communication with the intake port 27 and exhaust port 28. In the situation represented by unbroken lines in FIG. 6, the combustion chamber 26 communicates with the intake port 27. In another situation represented by dot-and-dash lines, the slot 51 puts the combustion chamber 26 in communication with the exhaust port 28. In a third situation represented by crossed lines, the slot 51 is apart from the two ports 27 and 28, in such a way that the bell 36 isolates the chamber 26 from the two ports 27 and 28. The direction of rotation of the bell 36 is represented by the arrow 52.

In order to retain the bell 36 against movements apart from piston 1 along the axis XX' despite the pressures exerted on it during expansion, the hollow shaft 42 carries, beyond the cylinder head 23, an annular cage 53 in which an axial thrust roller bearing is mounted. The fixed stay of the axial thrust bearing 54, is formed by a ring 56, itself abutted against the plate 44. The ring 56 is equipped with inner and outer gaskets 57, allowing the cage 53 to contain lubricating oil for the thrust bearing 54. The cage 53 has a plane lower face 55 adjacent to a plane upper face of the cylinder head 23.

A spark plug 58 extending in the axis XX' is screwed into the hollow shaft 42. The spark plug 58 therefore rotates together with the bell 36. The spark plug 58 is connected to the rest of the ignition circuit 59 by means of a rotary-contact terminal 61.

The structure of the engine frame will not be described in detail because it corresponds substantially to the example given in French Pat. application No. 85,18,826 of 19th December 1985 and in U.S. Pat. application No. 063,865 of 19th June 1987 in the Applicant's name. In particular, the shaft 48 can carry one or more cooling turbines.

According to the invention, round the combustion chamber 26, the working chamber 22 is delimited by an expansion progression face 62 which confronts the piston 1 and which is adjacent to the working face 24 of the piston 1 when the latter is at its top dead centre (FIG. 2). Thus, in this position which is that of the start of expansion corresponding to the most rapid pressure variations, only some of the area of the face 24 of the piston is exposed to the pressure. The piston will be fully exposed to the pressure only after covering a small portion of its expansion stroke. This results in a certain amount of progression in the exertion of the forces resulting from combustion on the piston, thus reducing the wear and increasing operating comfort.

At the start of expansion likewise, the equivalent surface area over which the pressure is exerted on the bell 26 and tends to push this in the direction away from the piston corresponds to only part of the cross-sectional area of the cylinder 2. Thus, the axial thrust bearing 54, like the piston, benefits from a progression in the exertion of the drive force.

Moreover, the surface area of the base surface of the combustion chamber 26 is reduced by the surface area of the face 62 in relation to the cross-sectional area of the cylinder 2. Thus, as shown in FIGS. 1 and 2, the combustion chamber 26 has a relatively large axial dimension, thus making it possible to give it a virtually perfect hemispherical form markedly more compact and uniform than those of known engines, this being achieved even if the compression ratio reaches 16 or 17 which is a value appropriate for a semi-diesel mode of operation.

A first embodiment of the bell according to the invention will now be described in more detail with reference to FIGS. 7 to 11.

In this embodiment, the progression face 62 is carried by the bell itself. It extends radially between a chamfer 63 of conical form, ensuring the connection with the inner face 41 delimiting the combustion chamber 26, and a cylindrical rim 64, the outside diameter of which corresponds to the inside diameter of a counter bore 65 of the liner 3 at its upper end, free of the coating 4. During operation, the cylindrical rim 64 is engaged freely rotatably in the end of the bore of the liner 3. The rim 64 has a plane end surface 66 rotating in the vicinity of the upper edge of the coating 4 which can have a thickness of approximately 1 mm. The inside diameter of the rim 64 corresponds to the inside diameter of the coated region of the cylinder 2. Thus, the rim 64 surrounds the end of the piston 1 adjacent to the face 24 when the piston 1 is at top dead centre (FIG. 2). The rim 64 performs additional guidance of the bell 36 in relation to the upper edge of the bore of the cylinder 2 and sealing relative to the gases between the working chamber 22 on the one hand and the ports 27 and 28 and the gap between the faces 37 and 39 on the other hand.

To prevent the operating vibrations and bending of the shaft 42 which could give rise to a rapid wear of the faces 37 and 39 and the faces of the rim 64, according to the invention the masses rotating with the bell 36 are balanced about the axis XX'. In particular, the unbalance which could occur as a result of the slot 51 is to be eliminated. For this purpose, the face 41 possesses a recess 67 extending over 180° equally distributed on each side of the axial mid-plane of the slot 51 (sectional plane of FIG. 8). This recess extends as far as the bottom of the bell 36 so that the mean diameter of the chamfer 63 is increased adjacent this recess and the progression face 62 is narrowed radially, still adjacent the recess 67.

To prevent the bell 36 from undergoing tilting torques about axes perpendicular to the axis XX', the balancing of the masses is obtained not only overall, but also in each plane perpendicular to the axis XX'. The radial depth of the recess 67 is determined in each plane with this in view.

As shown in FIG. 7, the slot 51 is an indentation made in the progression face 62 and in the rim 64 and the chamfer 63. This simplifies the production and ensures a maximum passage cross-section for the gases. However, if there is no provision, the absence of some of the face 62 in line with the indentation 51 will produce an unbalance of the forces on the piston and on the bell 36 when the piston is at top dead centre, this resulting in tilting torques exerted on these elements about axes perpendicular to the axis XX'.

To prevent this friction- and wear-generating effect, the bell 36 has, in a position diametrically opposite the slot 51, a clearance 72 made in the progression face 62 so as to allow the pressure to be exerted on the piston 1 and on the bell 36 at this location when the piston 1 is at top dead centre. The dimensions of the clearance 72 are determined so as substantially to cancel any tilting torque exerted on the piston about each axis perpendicular to the axis XX' of the cylinder 2 when the piston 1 is at top dead centre. In principle, this result is achieved when the integral of the moments about an axis perpendicular to the axis XX' of the elementary areas absent because of the recess 72 and the narrowing of the face 62 in line with the recess 67 is equal to the integral of the moments about the same axis of the elementary areas absent in the face 62 because of the indentation 51.

As also shown in FIGS. 7 and 8, the end face of the shaft 42, visible in the chamber 26, has a concave spherical form 68 ensuring continuity with the concave spherical form of the face 41. However, to increase the passage cross-section presented to the gases, the indentation 51 also encroaches on the end of the shaft 42, so that the spherical face 68 of the end of the shaft 42 is interrupted by an incision 69. So that the balancing of the masses is obtained in each plane, as stated above, the recess 67 too encroaches on a region, designated by 71, of the end of the shaft 42, thus constituting another interruption of the spherical face 68.

In the example illustrated in FIGS. 7 to 11, the plane of the edge 73 connecting the face 41 outside the recess 67 to the chamfer 63 is a diametral plane of the sphere to which the surface 41 belongs.

In the example of FIG. 12, otherwise identical to that of FIGS. 8 to 11, to increase the volume of the combustion chamber 26 a cylindrical zone 74 has been inserted between the edge 73 and the spherical part of the face 41. In the region on which the recess 67 encroaches, the zone 74 has an increased diameter and is no longer necessarily exactly cylindrical, depending on the requirements of the balancing of the masses plane by plane.

Figure 13:
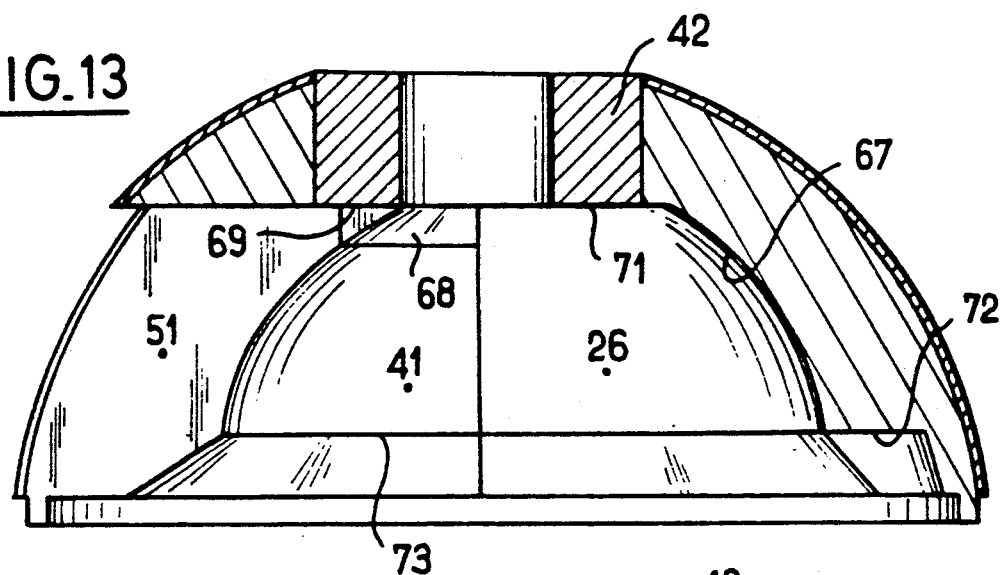

By contrast, in the example of FIG. 13, in order to provide a combustion chamber 26 of reduced volume, the surface 41 is not more than a spherical dome, of which the largest diameter about the axis XX', namely the diameter of the edge 73, is less than the diameter of the sphere to which it belongs. Of course, as in the preceding examples, this partial sphere is also interrupted by the slot 51 and by the recess 67.

The example illustrated in FIGS. 14 to 17 is identical to that of FIGS. 7 to 11, with the exception of the elements which will be described below.

To limit the number of edges liable to constitute hot places during operation, the chamfer 63 has a curved profile. Moreover, the rim 64 directed towards the piston is omitted. It is replaced by two partial collars 76 (FIG. 17), each of which has one end 77 in the extension of one of the lateral faces of the indentation 1. For reasons of the balancing of masses about the axis XX', the other two ends 78 of the collars 76 have the same mutual spacing as the ends 77.

Figure 14:
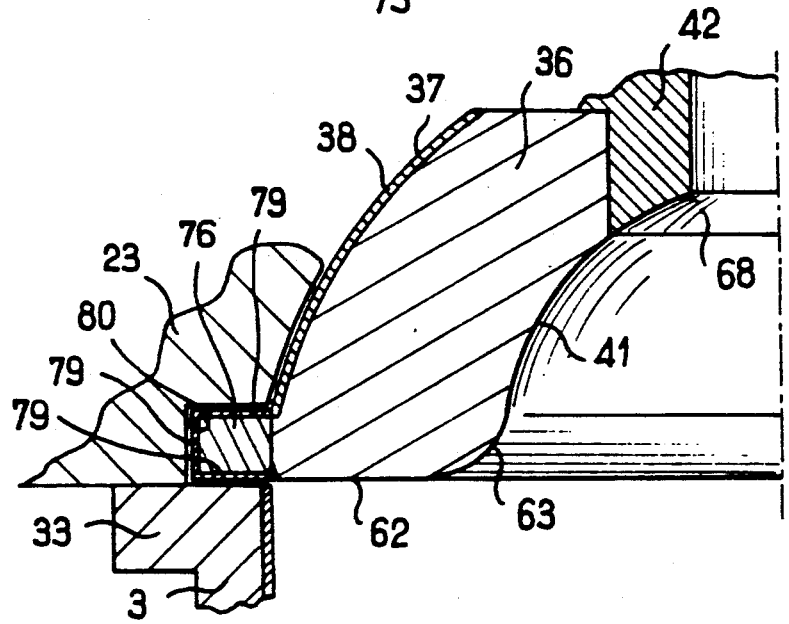
FIG. 14 is a sectional half-view in the plane XIV—XIV of FIG. 15.
Figure 15:
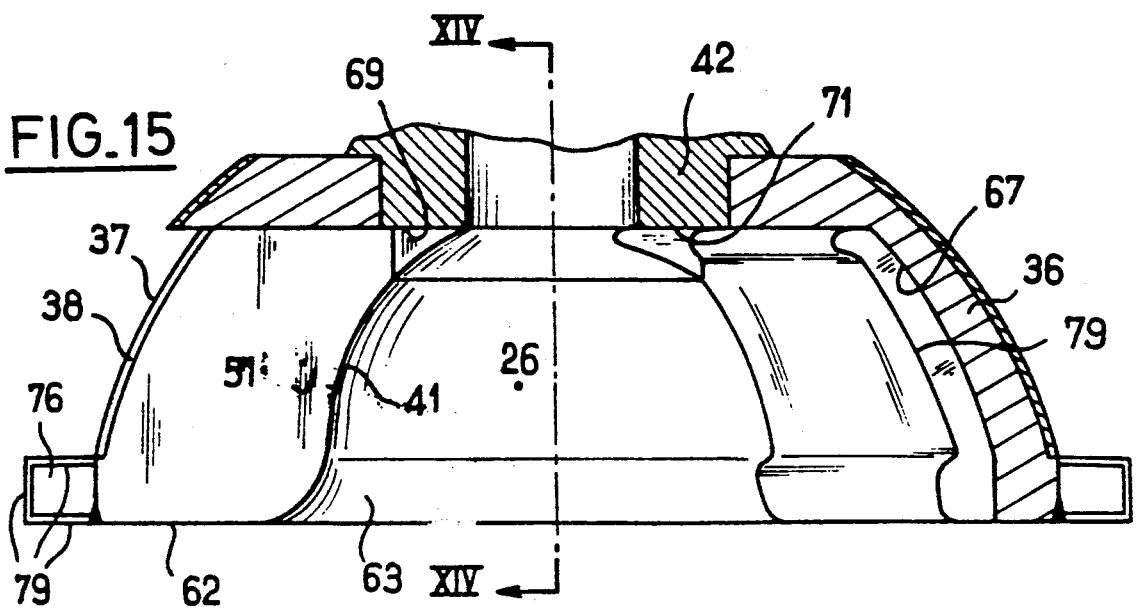
Figure 16:
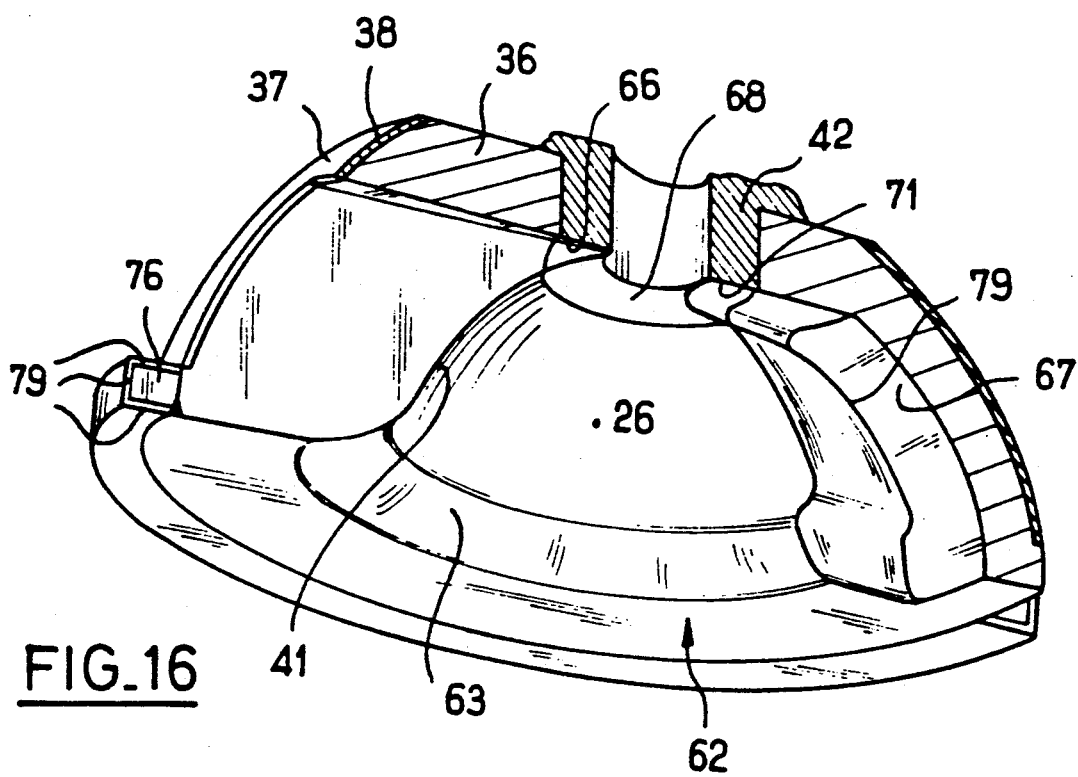
FIG. 16 is a view similar to that of FIG. 8, but relating to the alternative version of FIGS. 14 and 15.
Figure 17:
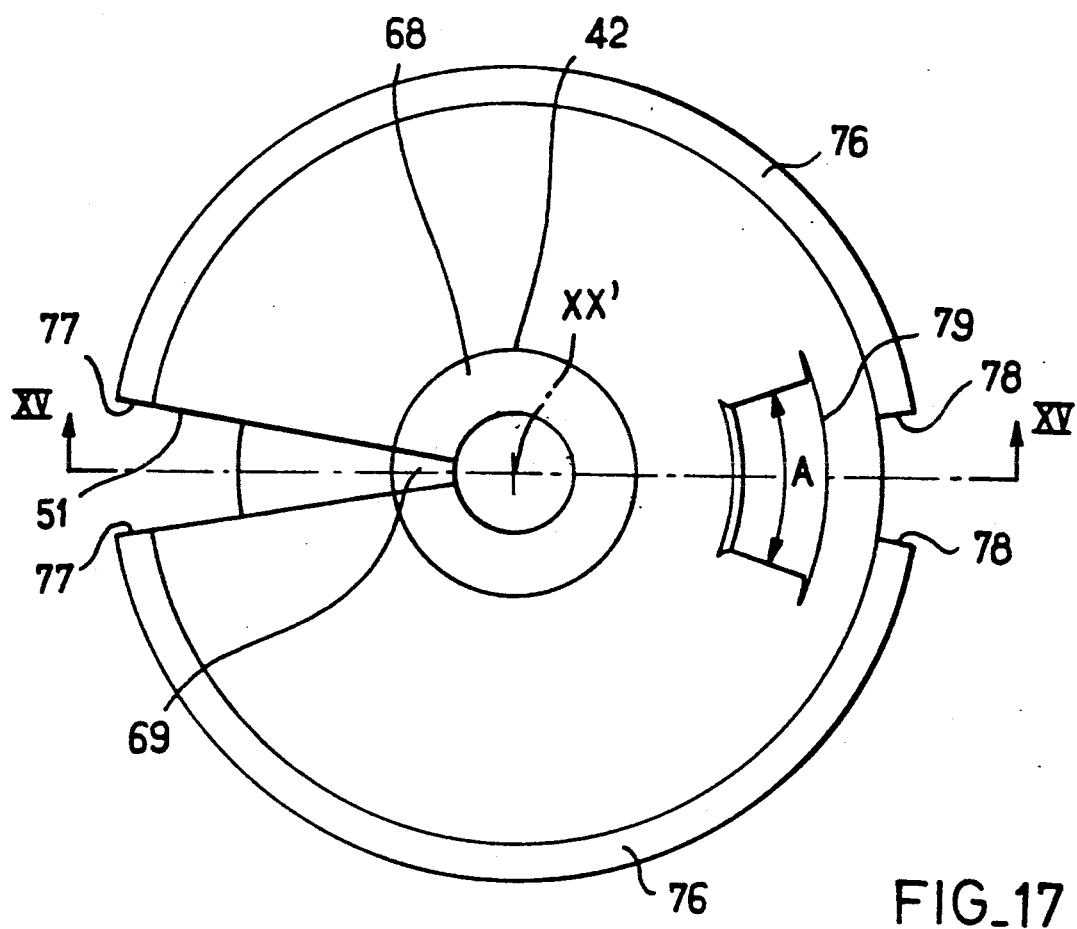
FIG. 17 is a diagrammatic bottom view of the bell of FIGS. 14 to 16.

As shown in FIGS. 14 to 16, each partial collar 76 has an anti-heat covering 79 on its three outer faces. The inner face of the half-collars 76 is welded to the face 37 of the bell 36 in a position adjacent to the progression face 62. During operation, as shown in FIG. 14, the partial collars 76 are received in an annular receptacle 80 of corresponding profile which is provided between the cylinder head 23 and the collar 33 of the liner 3.

Furthermore, the balancing of the masses plane by plane is no longer obtained by varying the radial depth of the recess 67. On the contrary, the recess 67 has a constant radial depth which is at a maximum, in view of the minimum resistance which the bell 36 must offer relative to bursting under the effect of the pressure in the combustion chamber. Here, the balancing plane by plane is carried out by varying the angle at which the recess 67 extends about the axis XX'. FIG. 7 shows the theoretical contour of the recess 67 on the surface internally delimiting the combustion chamber in the recessed region. Of course, in each plane perpendicular to the axis XX', the recess angle, for example the angle A in a given plane, is divided into two equal parts by the plane XV—XV of symmetry of the indentation 51, this plane containing the axis XX'.

According to another particular feature of this embodiment, the area over which the recess 67 opens through the progression face 62 is determined so as to ensure the balancing of the pressures on the piston 1 and on the bell 36, in order to cancel any tilting torque on these elements. There is therefore no longer any need to make a special clearance in the bell 36 for the purpose of this balancing.

In the embodiment of FIG. 18, the inner face 41 of the bell 36 has a substantially spherical form at any point located outside the slot 51. The balancing of the masses is obtained by shifting the centre C of the sphere relative to the axis XX' in the opposite direction to the recess 51. If a more accurate balancing of the masses is desired, in each plane the position of the centre of the circle corresponding to the intersection of the face 41 with the particular plane can be determined.

By means of this overall shift or shift plane by plane, the axis of the conical chamfer 63 is likewise shifted correspondingly, thus contributing to the balancing of the tilting moments on the piston and on the bell. This balancing can be refined by inclining the axis of the chamfer slightly in relation to the axis XX'.

This embodiment makes it possible to preserve a highly uniform shape for the combustion chamber 26 despite the needs for balancing.

In the embodiment of FIG. 19, the face 62 is carried by a plate 81 inserted between the liner 3 and the cylinder head 23. The plate 81 has a circular bore 82, via which the chamber 26 communicates with the working chamber 22. The bore 82 is widened, on the same side as the bell 36, by a counterbore 83, in which a lower edge 84 of the bell 36 is guided, the said lower edge 84 extending over the entire periphery of the bell and, in particular, not being interrupted by the slot 51.

The balancing recess 67 is of the type described with reference to FIGS. 7 to 11, in that its radial depth is determined plane by plane, its angular extent being 180° in all the planes. In this embodiment, the radial thickness of the bell is less than in the preceding embodiments, so that there is less mass of material absent because of the slot 51, and consequently the radial depth of the recess 67 is likewise smaller. The progression face 62 has a radial dimension which is equal all round the axis XX', so that no compensation is needed in respect of the tilting moments.

The axial force supported by the bell during operation is lower than in the preceding embodiments, since, at any moment, the pressure is exerted on the bell only over the cross-sectional area of the cylinder 2, less the area of the progression face 62.

Of course, the invention is not limited to the examples described and illustrated.

In particular, the spark plug could be mounted fixedly in the cylinder head in a position which is exposed by the slot 51 at the moment appropriate for ignition.

On the other hand, the bell could have n slots and the cylinder head n intake ports and n exhaust ports, whilst the rotational speed of the bell, such as 36, in the cylinder head, such as 23, would be equal to the rotational speed of the shaft, such as 48, divided by 2n. Furthermore, when there is more than one slot, such as 51, these slots are identical and are equally distributed angularly about the axis XX'. There is therefore no longer any need to provide the means for balancing the masses about the axis XX' and for cancelling the tilting torques about axes perpendicular relative to the axis XX'.

Of course, the invention can be used on types of engine other than the barrel engine, especially engines with a connecting-rod/crank system.

I claim:

1. In an internal-combustion engine comprising at least one cylinder (2), in which a working chamber (22) is contained between a piston (1) reciprocable between a top dead center position and a bottom dead center position and connected to an output shaft (6) by a movement-converting mechanism (7), and a cylinder head (23) equipped with an intake port (27), with an exhaust port (28) and with a shutter bell (26), an outer face (37) of said shutter bell (36) being adjacent to a complementary inner face (39) of the cylinder head (23), the working chamber (22) being reduced to a combustion chamber (26) defined between an inner face (41) of the bell (36) and the piston (1) when the piston is at said top dead center position, the engine also comprising combustion-generating means (58) and means (42, 46 to 48) for driving the bell (36) about an axis (XX') in relation to which the outer face (37) of the bell (36) has a shape of revolution, whereby the working chamber (22) selectively and successively communicates with said ports via a slot (51) of the bell (36), the working chamber (22) being delimited about the inner face (41) of the bell by a squish face (62) confronting the piston (1) and adjacent to the piston when the piston (1) is at its top dead center position, thereby to reduce surface area of the piston which is exposed to gas pressure when the piston is at its top dead center position; the improvement wherein the squish face has an area which is distributed about the axis (XX') of the cylinder in such a way as substantially to cancel any tilting torque exerted on the piston (1) when the piston (1) is at said top dead center position, and wherein the bell (36) has means (67) for balancing the masses that rotate about its axis of rotation (XX'), and wherein the inner face of the bell (36) has a substantially spherical region.

2. Engine according to claim 1, wherein the squish face (62) is carried by the bell (36).

3. Engine according to claim 2, wherein the bell has a chamfer (63) connecting the squish face (62) to said substantially spherical region.

4. Engine according to claim 2, wherein the slot (51) is an indentation made in the squish face (62), and wherein the squish face (62) has at least one pressure-balancing clearance (67, 72), so as substantially to cancel any tilting torque exerted on the piston (1) when the piston (1) is at said top dead center position.

5. Engine according to claim 4, wherein the slot (51) is an indentation made in the squish face (62), and wherein the combustion chamber (26) is shifted relative to axis (XX') of the cylinder (2) in a direction pointing away from the indentation (51).

6. Engine according to claim 1, wherein the means for balancing masses comprise a recess (67) located in the inner wall (41) of the bell (36) delimiting the combustion chamber (26).

7. Engine according to claim 6, wherein in each plane perpendicular to the axis of rotation of the bell, a dimension (A) of the recess (67) is determined in such a way that the masses are balanced in this plane.

8. Engine according to claim 6, wherein the slot (51) is an indentation made in the squish face (62), and wherein the recess (67) of the inner wall (41) of the bell (36) opens through the squish face (62), so as substantially to cancel any tilting torque exerted on the piston (1) when the piston is at said top dead center position.

9. Engine according to claim 1 comprising means (64, 76) for guiding a peripheral edge of the bell (36) in relation to the cylinder (2).

10. Engine according to claim 9, wherein the means (64, 76) for guiding a peripheral edge of the bell (36) are formed as sealing means whereby the working chamber (22) is sealingly separated form a gap between the cylinder head (23) and the shutter bell (36).

* * * * *